United States Patent [19]
Langford et al.

[11] Patent Number: 6,089,006
[45] Date of Patent: Jul. 18, 2000

[54] GRASS CATCHER FOR LAWN MOWER

[75] Inventors: LeRoy Langford, LaPorte, Ind.; Anthony N. Pink, Shorewood, Minn.; Richard J. Guertin, Mounds View, Minn.; Michael N. Zenner, Lakeville, Minn.

[73] Assignee: The Toro Company, Bloomington, Minn.

[21] Appl. No.: 09/019,822

[22] Filed: Feb. 6, 1998

[51] Int. Cl.[7] .................................................. A01D 43/063
[52] U.S. Cl. ................................ 56/202; 56/205; 56/206; 56/13.3
[58] Field of Search .......................... 56/194, 202, 203, 56/205, 206, 13.3, 16.6; 15/347, 348; D15/17

[56] References Cited

U.S. PATENT DOCUMENTS

| | | |
|---|---|---|
| 3,624,989 | 12/1971 | Gatheridge . |
| 3,651,621 | 3/1972 | Davis ............................................. 5/206 |
| 3,716,977 | 2/1973 | Jackson ...................................... 56/202 |
| 3,722,192 | 3/1973 | Corbett ...................................... 56/202 |
| 3,974,631 | 8/1976 | Rhodes ....................................... 56/202 |
| 3,987,606 | 10/1976 | Evans ........................................ 56/13.4 |
| 4,032,307 | 6/1977 | Sommerfeld ............................... 95/282 |
| 4,095,398 | 6/1978 | Aumann et al. ........................... 56/202 |
| 4,104,852 | 8/1978 | Tackett ...................................... 56/202 |
| 4,310,998 | 1/1982 | Cuba .......................................... 56/202 |
| 4,345,418 | 8/1982 | Arizpe ....................................... 56/202 |
| 4,426,830 | 1/1984 | Tackett ...................................... 56/202 |
| 4,589,249 | 5/1986 | Walker et al. ............................ 56/16.6 |
| 4,761,943 | 8/1988 | Parker et al. .............................. 56/202 |
| 4,819,417 | 4/1989 | Bryant et al. ............................. 56/202 |
| 4,881,362 | 11/1989 | Parker et al. .............................. 56/202 |
| 4,922,696 | 5/1990 | Burns et al. ............................... 56/202 |
| 4,964,266 | 10/1990 | Kolb ........................................... 56/202 |
| 4,969,320 | 11/1990 | Langford ................................... 56/16.6 |
| 5,036,650 | 8/1991 | Tesch et al. ............................... 56/16.6 |
| 5,195,310 | 3/1993 | Kettler et al. ............................. 56/202 |
| 5,224,236 | 7/1993 | Sallquist ..................................... 15/321 |
| 5,321,939 | 6/1994 | Fuse et al. ................................. 56/10.2 |
| 5,409,512 | 4/1995 | Wilkerson et al. ........................ 55/302 |
| 5,425,223 | 6/1995 | DeLaRonde .............................. 56/10.2 |
| 5,605,033 | 2/1997 | Olmr .......................................... 56/10.2 |
| 5,630,247 | 5/1997 | Venia ......................................... 15/347 |
| 5,685,134 | 11/1997 | Thornburg ................................ 56/12.9 |
| 5,783,086 | 7/1998 | Scanlon et al. . |
| 5,875,620 | 3/1999 | Goeke et al. .......................... 56/202 X |

OTHER PUBLICATIONS

Toro Owner's Manual; dated 1995; pertaining to ProLine models 816, 820D, and 920D.

*Primary Examiner*—James A. Lisehora
*Attorney, Agent, or Firm*—Donald S. Trevarthen

[57] ABSTRACT

A grass catcher for receiving air and grass clippings from a mower cutter deck includes an inlet for admitting air and clippings into the grass catcher, an outlet port for exhausting air out of the grass catcher, and at least two cylindrical, perforate air filters interposed between the inlet and the outlet port. The filters separate grass clippings from the air and permit air to pass through the filters and on to the outlet port. The grass catcher also includes a wave form energy transmitter and a wave form energy receiver positioned in the grass catcher. The transmission of wave form energy between the transmitter and the receiver is interrupted when the level of accumulated grass clippings in the catcher exceeds a predetermined level. The interruption of the transmission triggers an alarm to alert an operator of the mower of the high clipping level within the catcher.

32 Claims, 6 Drawing Sheets

GRASS CATCHER FOR LAWN MOWER

TECHNICAL FIELD

This invention pertains to grass catchers for lawn mowers. More specifically, this invention pertains to grass catchers for riding lawn mowers.

BACKGROUND OF THE INVENTION

Many types of rotary lawn mowers are known. Such equipment may generally be classified as walk-behind mowers or riding mowers, both of which typically include one or more cutting decks which perform the actual mowing operation. The mower may also include a grass catcher connected to the cutting deck by a conduit for collecting grass clippings generated by the cutting deck. Riding lawn mowers generally have larger grass catchers capable of collecting and carrying more grass clippings. The present invention relates specifically to riding mowers with grass catching systems and the remainder of the discussion will focus accordingly.

Mowing decks are often convertible between: a mulching mode, where clippings are returned directly to the lawn by the cutting deck; a discharge mode, where clippings are discharged outwardly from the cutting deck; and a bagging or catching mode, where clippings are delivered from the cutting deck to the grass catcher. If the grass to be cut is long, it may be difficult to operate the mower in mulching mode without leaving large clumps of grass on the lawn. In such conditions, it is often desirable to collect the clippings in the grass catcher so as to produce a lawn with a more manicured appearance. While the catching mode can provide a more aesthetically pleasing lawn, it has a drawback. Particularly, the collection of clippings necessarily requires that the catcher be periodically emptied as it becomes full. If the catcher is not emptied upon reaching its full condition, the catcher and the conduit extending between the deck and the catcher can become clogged with clippings. Emptying the catcher and clearing the conduit can then become troublesome. Thus, it is desirable for the catcher to have a high clippings capacity and an effective method of dispersing the clippings within the catcher to ensure even, optimal filling. A catcher with these characteristics does not need to be emptied as often as a smaller, less efficient catcher. Ideally, the grass catcher would have a method of alerting the operator to a full catcher condition to prevent catcher/conduit clogging.

Grass catchers generally have a means for admitting air and clippings transported to the catcher from the cutting deck and for exhausting air out of the catcher after the clippings have been deposited therein. Preferably, the air passes through the catcher with relative ease so as not to create substantial back pressure within the catcher and conduit. Accordingly, the catcher should have an effective filtering means that permits continual passage of air while preventing the discharge of entrained clippings. Ideally, the filtering means is removably mounted within the catcher to facilitate cleaning and replacement.

Another preferred feature of a grass catching system is the ability to discharge the air exiting the catcher in a direction away from the operator. Although the discharged air is preferably free from clippings and debris, it is generally perceived that directing this air away from the operator is desirable as it improves operator comfort. Preferably, the air discharge should be directed toward the rear of the mower in a downward direction. This ensures that air or debris that passes through the filtering system is not projected beyond an area immediately surrounding the mower.

Because of the increased size of grass catchers used on riding mowers, it is advantageous to provide a means for assisting the operator in emptying clippings once the catcher becomes full. For example, the catcher may tilt so that the clippings exit the catcher more easily.

Furthermore, the versatility to use the same mower in either the discharge mode or the catching mode is highly desirable. The mower should be able to switch between operating modes with minimal operator intervention. Ideally, physical disconnection or removal of the catcher would not be required. When operating in the discharge mode, the mower should disperse the clippings evenly over the lawn.

Applicants are aware of several grass catchers that have been tried in the past. Although each is commendable for addressing one or more of the particular issues discussed above, shortcomings are evident with each.

U.S. Pat. No. 3,716,977 issued Feb. 20, 1973 to Jackson and assigned to McDonough Power Equipment, discloses a riding mower and a grass catcher. The grass catcher includes a grass collecting bag made of a woven, porous material that permits exhaust air to pass through while it retains clippings and debris.

U.S. Pat. No. 3,722,192 issued on Mar. 27, 1973 to Corbett, discloses a walk-behind lawn mower with a perforate cowl. A hood placed above the cowl acts as an air deflecting shield for exhaust air.

U.S. Pat. No. 4,819,417 issued on Apr. 11, 1989 to Bryant et al. and assigned to F. H. and H. Limited, discloses a large, barrel shaped grass catcher for use with a riding lawn mower. The grass catcher includes an exhaust port and a cylindrical screen positioned below the port. The screen acts as a filter to reduce the escape of grass clippings through the port.

U.S. Pat. No. 4,310,998 issued to Cuba on Jan. 19, 1982 and assigned to Gilson Brothers Company, discloses a grass catcher for a riding lawn mower. The grass catcher includes a filter assembly which uses wire mesh or other suitable material as a filter media. The filter stops grass clippings from passing through the discharge passage. A deflector hood deflects clippings and air entering the catcher. Air is exhausted through a downwardly facing port at the rear of the grass catcher.

U.S. Pat. No. 5,195,310 issued to Kettler et al. on Mar. 23, 1993 and assigned to Deere and Co., discloses a grass catcher for use with a lawn tractor. The grass catcher includes discharge ports and a screen for filtering clippings from the exhaust air before it is discharged through the ports. The discharge ports exhaust air in a downward direction relative to the catcher.

U.S. Pat. No. 4,969,320 issued Nov. 13, 1990 to Langford and assigned to The Toro Company, discloses a grass level checker for a grass catcher. The Langford grass catcher requires the operator to manually manipulate the level checker. As the grass catcher fills, the grass level checker is subject to increased resistance to operator manipulation. Accordingly, the operator can determine, based on the resistance of the level checker, the amount of accumulated grass within the catcher. The Langford grass catcher includes grass bags made of a loosely woven polyester. The bags are configured to accept plastic lawn debris bags for accepting clippings and debris from the cutting deck. An exhaust port permits passage of exhaust air that has passed through the filtering screen.

U.S. Pat. No. 4,964,266 issued to Kolb on Oct. 23, 1990 and assigned to Wolf-Gerate GmbH, discloses a grass catcher attached to the frame of a walk-behind lawn mower. The grass catcher includes a sensor for sensing a full condition within the catcher. The sensor may be a capacitive, inductive or resistance sensor which measures the grass collected in the mouthpiece. The sensor could also be an infrared sensor which senses infrared radiation, or it could be a pressure sensor. The sensor is connected to an electronic evaluation circuit that produces an optical or acoustic warning signal to the operator. The sensor is positioned near the inlet of the grass catcher.

U.S. Pat. No. 5,321,939 issued to Fuse et al. on Jun. 21, 1994 and assigned to Honda discloses a riding lawn mower with a grass catcher. The grass catcher receives grass clippings from the cutting deck. The grass catcher includes a light sensor mounted in the upper cylindrical body of a "shooter" (the conduit which delivers air and clippings into the catcher). The sensor includes a light emitting portion and a light receiving portion. If the receiver and the accompanying controller sense a light blocking condition for a period of time exceeding a predetermined value, then a full condition warning lamp and buzzer are activated to alert the operator of a full catcher condition. The full condition sensed would, of course, be at the location of the sensor which is at the end of the shooter. A slightly different embodiment is shown in FIG. 7 where the sensor is mounted on tabs located just outside of shooter.

U.S. Pat. No. 4,922,696 issued to Burns et al. on May 8, 1990 and assigned to The Murray Ohio Manufacturing Company discloses a riding lawn mower with a grass catcher attached. The grass catcher includes a vertically elongated transparent window for the operator to view the clipping level within the catcher U.S. Pat. No. 5,425,223 issued to DeLaRonde on Jun. 20, 1995 discloses an indicator means to detect blockage of a duct used to transport clippings from a cutting blade to a grass catcher. A flag member is raised to a generally perpendicular position relative to the duct when air is flowing freely through the duct. When the flow of air through the duct is reduced or stopped due to a blockage in the duct, the flag falls from its generally perpendicular position, thus visually alerting the operator of an unsatisfactory air flow condition.

U.S. Pat. No. 5,605,033 issued to Olmr on Feb. 25, 1997 discloses a riding lawn mower with a grass catcher. The grass catcher includes a detector with a pressure activated switch which is responsive to a pressure condition in a conduit for conveying clippings and air to the catcher. When the static pressure in the conduit increases due to a full catcher condition, the switch closes. This activates a circuit which disables the rotation of the cutting blade.

U.S. Pat. No. 4,589,249 issued to Walker et al. on May 20, 1986 and assigned to Walker Manufacturing Co. discloses a riding lawn mower with a catcher for catching grass clippings. The catcher can be raised and tipped as shown in FIG. 5. When raised and tipped, the catcher door opens allowing the accumulated clippings to fall from the catcher. The catcher also includes a detector. The detector is mounted on the catcher and is described as a horn or beeper that is actuated by a pressure responsive switch. The switch is apparently coupled into the interior portion of the conduit. The horn or beeper is probably activated when back pressure in the conduit rises as a result of a full catcher condition.

U.S. Pat. No. 3,974,631 issued to Rhodes et al. on Aug. 17, 1976, and assigned to J. I. Case Company, discloses a grass catcher mounted on a riding mower. The grass catcher includes a deflector for promoting substantially equal distribution of grass clippings to the grass collection containers. Air exhaust plates have suitable openings for allowing passage of exhaust air while retaining clippings and other debris in the catcher. The '631 patent also discloses a catcher emptying system that permits the clipping carrying portion of the catcher to pivot away from the mower.

The present invention provides a novel lawn mower grass catcher that is summarized below.

SUMMARY OF THE INVENTION

The present invention includes a grass catcher for receiving air and grass clippings from a cutting deck of a mower. The grass catcher includes an inlet for admitting air and clippings into the catcher, an outlet port for exhausting air out of the grass catcher, and a pair of cylindrical, perforate air filters interposed between the inlet and the outlet port, wherein the filters separate grass clippings from the air and permit air to pass through the filters to the outlet port.

Preferably, the two cylindrical, perforate air filters are substantially identical in shape and size to one another. The filters can be removably mounted within the grass catcher to facilitate cleaning and replacement of the filters.

The grass catcher of the present invention can also include a hinged door movable between a first, closed position and a second, open position. The second, open position facilitates clipping removal from the grass catcher. The hinged door can include the outlet port for exhausting air out of the grass catcher. The outlet port can be downwardly facing in relation to the hinged door and the grass catcher so that the outlet port exhausts air in a downward direction when the door is in the first, closed position.

The hinged door can be connected to the catcher by at least one hinge. The door can be disconnected from the catcher by manipulation of the hinge(s) so that grass clippings and air are permitted to pass through an opening in the catcher created when the door is disconnected from the catcher.

The present invention can also include a wave form energy transmitter and a wave form energy receiver both positioned in the grass catcher at a location distal from the inlet. The transmission of wave form energy between the transmitter and the receiver is interrupted when the level of accumulated grass clippings within the catcher exceeds a predetermined level. The interruption of the transmission triggers an alarm to alert an operator of the mower of the high clipping level within the catcher.

The wave form energy transmitted between the transmitter and the receiver can be infrared.

The grass catcher can also include means for delaying the triggering of the signal until transmission of the wave form energy between the transmitter and the receiver has been interrupted longer than a predetermined time.

The grass catcher of the present invention can also be hingedly connected to a traction vehicle having a rotary cutting deck and a discharge conduit extending from the cutting deck to the grass catcher. The grass catcher can be pivoted from a first position where the catcher is operatively connected to an upper end of the discharge conduit and a second position where the catcher is disconnected from the upper end of the discharge conduit.

The grass catcher of the present invention can also include an upper surface of the catcher near the inlet wherein the upper surface deflects grass clippings entering the grass catcher. Such deflection enhances the even distribution of grass clippings within the grass catcher and enhances the grass clipping capacity of the catcher. The upper surface may be located intermediate to the cylindrical, perforate air filters.

The grass catcher of the present invention can be mounted on a riding lawn mower with a rotary cutting deck.

Further aspects of the invention are shown and described with reference to the appended Drawing, described below.

BRIEF DESCRIPTION OF THE DRAWING FIGURES

The invention will be further described with reference to the appended Drawing, wherein.

DETAILED DESCRIPTION OF A PREFERRED EMBODIMENT

Figure 1:
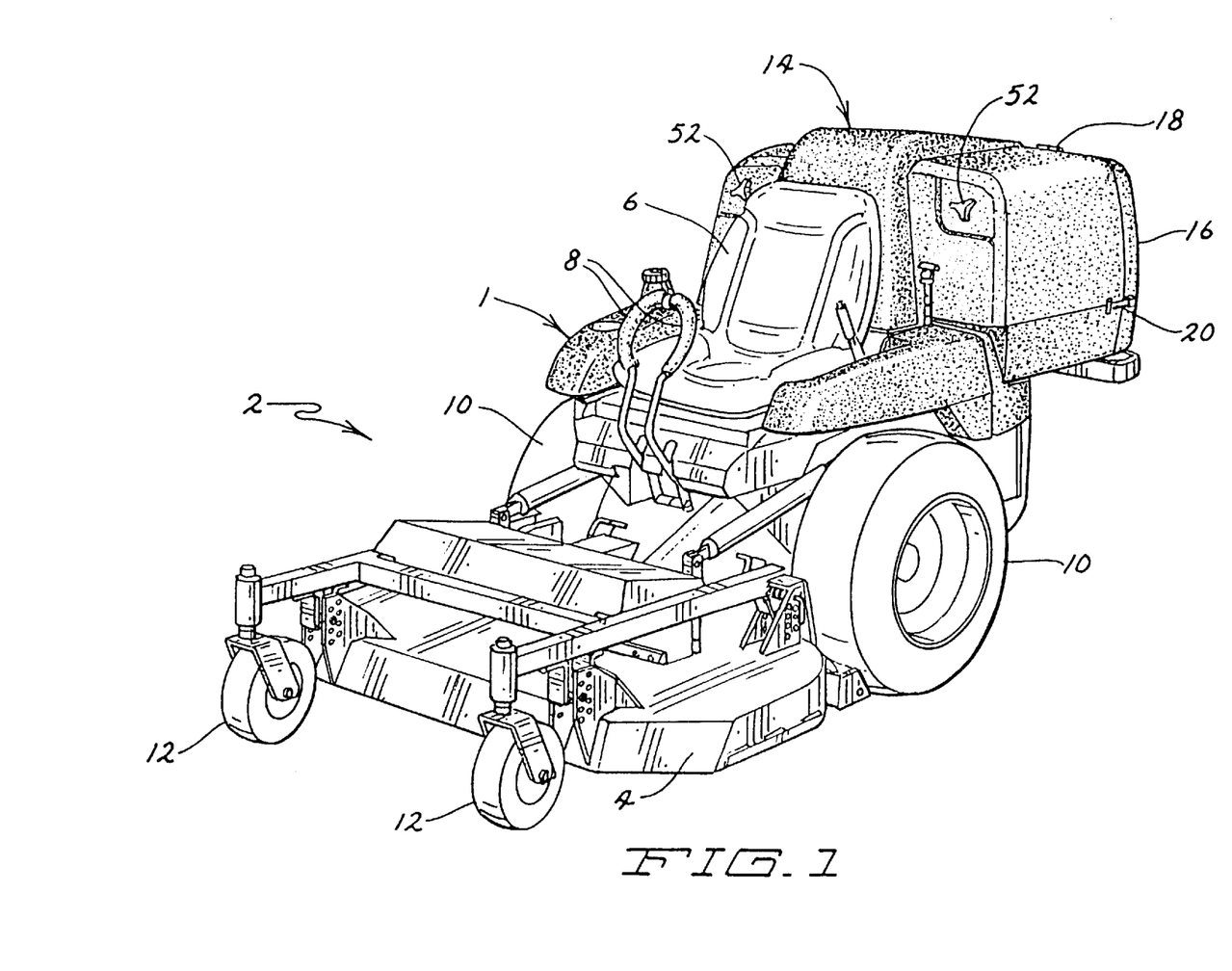
FIG. 1 is a left front perspective view of a riding lawn mower with the preferred grass catcher according to the present invention.

With reference to the Drawing, wherein like reference numerals designate like parts and assemblies throughout the several views, FIG. 1 is a left front perspective view of a riding lawn mower 2. The mower 2 includes a traction vehicle 1 and a cutting deck 4 beneath which rotates a cutting blade (not shown) for cutting grass. The vehicle 1 includes an operator's seat 6 and a set of propulsion and steering controls 8 for controlling the speed and direction of the vehicle 1. A pair of drive wheels 10 provide propulsion and steering for the vehicle 1. A single rear wheel 11 (shown in FIG. 2) supports the rear of the vehicle while a pair of front casters 12 partially support the cutting deck 4.

The mower 2 includes a grass catcher 14 positioned behind the operator's seat 6. The grass catcher 14 of the preferred embodiment is constructed of low density polyethylene and is manufactured by rotational molding. The grass catcher 14 includes a door 16 that is best viewed in FIGS. 2, 3, 4 and 6. The door 16 is connected to the catcher 14 by a pair of hinges 18. When the door 16 is placed over the rear opening of the catcher 14, a pair of latches 20 on the door 16 engage respective latch receivers 22 (best viewed in FIG. 3) on the side walls of the catcher 14 to secure the door 16 in a first, closed position. The door 16 can be rotated about the hinges 18 to a second, open position by disengaging the latches 20 from the latch receivers 22 and manually raising the door 16. In the preferred embodiment, hinges 18 are conventional two-piece hinges. The first piece of each hinge attaches to the catcher 14 and the second piece attaches to the door 16 at a corresponding position. The first and second piece of each hinge 18 is joined by a hinge pin. In the preferred embodiment, each hinge pin comprises a socket head cap screw (not shown) secured with a nut (also not shown). However, those skilled in the art will appreciate that other hinge pins (e.g., the quick-disconnect variety) could also be used. The door 16 can be completely disconnected from the catcher 14 by loosening each nut and removing both socket head cap screws. Completely disconnecting the door 16 from the catcher 14 in this fashion provides certain advantages as will be described below.

Figure 3:
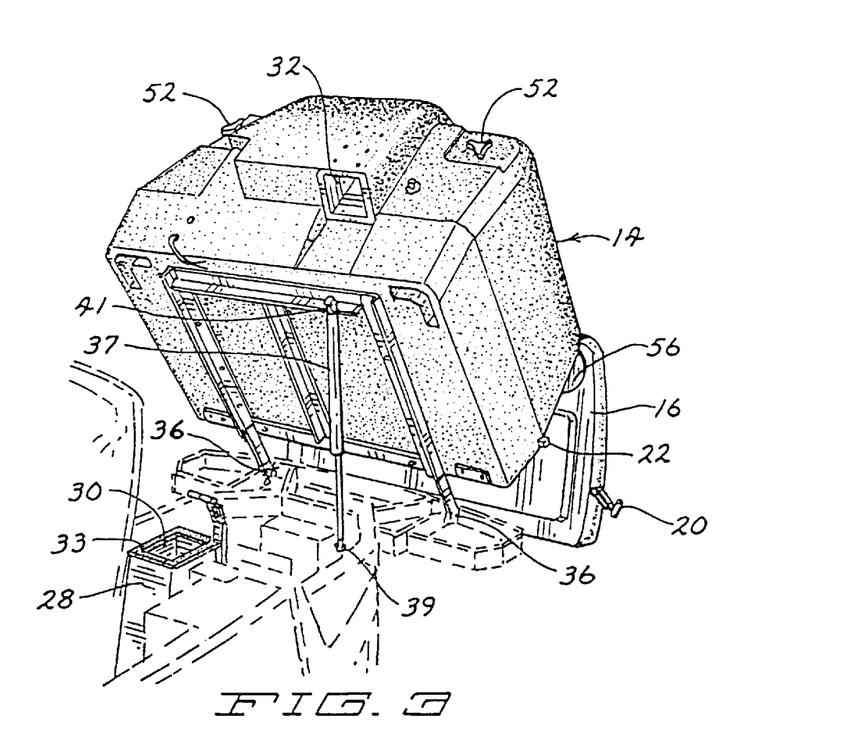
FIG. 3 is a partial perspective view of the preferred grass catcher of FIG. 1 with the grass catcher upwardly pivoted to its second or emptying position.
Figure 6:
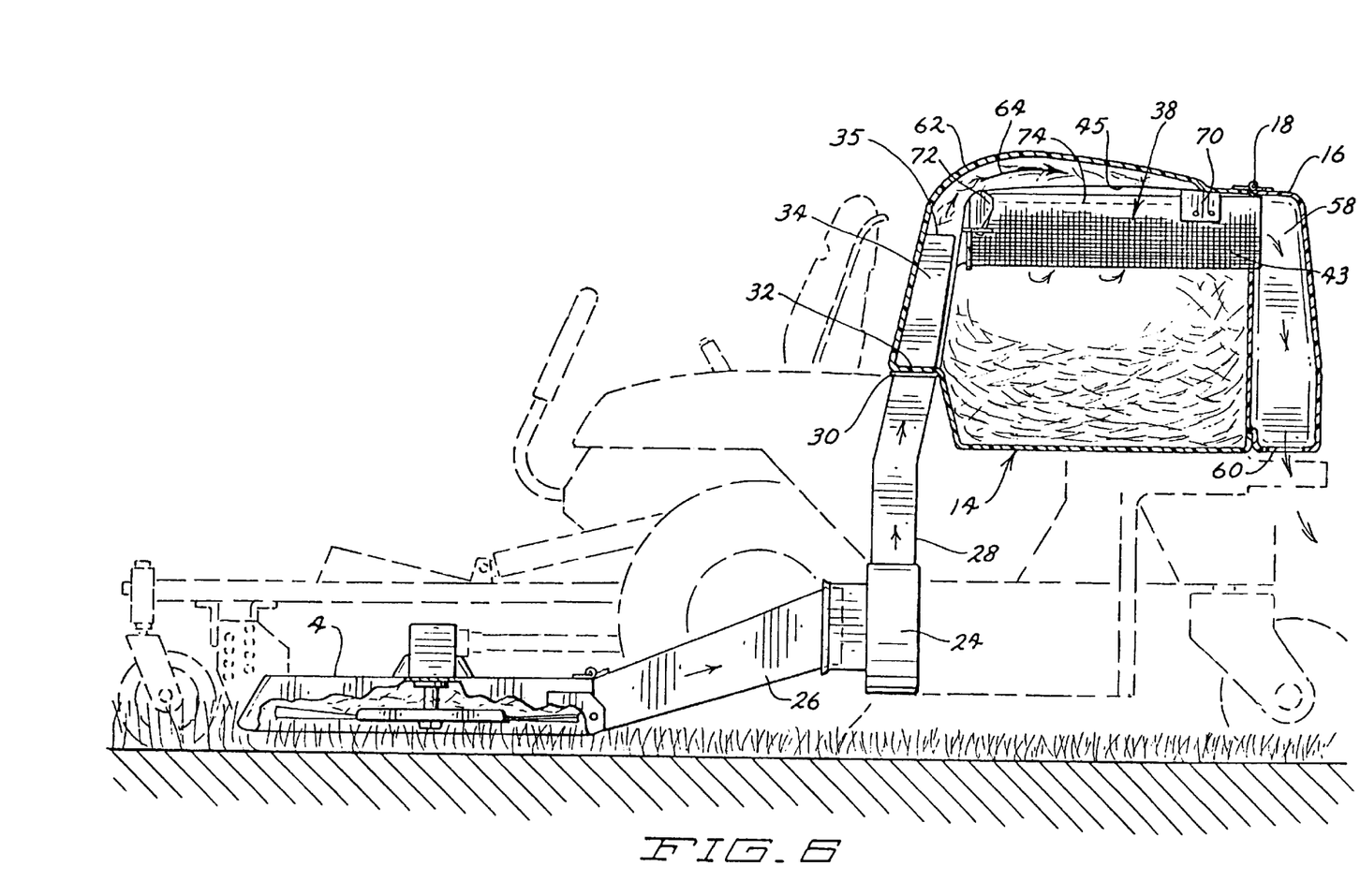
FIG. 6 is a sectional view taken along line 6—6 of FIG. 4.

As best shown in FIG. 6, the mower 2 includes a blower 24 that propels air and clippings from the cutting deck 4 through adjoining conduits 26 and 28 and into the catcher 14. The discharge conduit 28 has an upper end 30 as shown in FIG. 3. The upper end 30 of discharge conduit 28 is positioned to abut an entrance port 32 of the grass catcher 14. Closed cell foam 33 surrounds the upper end 30 of the conduit 28. The closed cell foam 33 provides a generally airtight seal between the upper end 30 and the entrance port 32 when they are in an abutting relationship. Referring again to FIG. 6, the grass catcher 14 includes an extension tube 34 extending from the entrance port 32 up into the catcher 14. The top of the extension tube 34 forms an inlet 35 to the interior of the grass catcher 14.

Figures 4, 5, 5A:
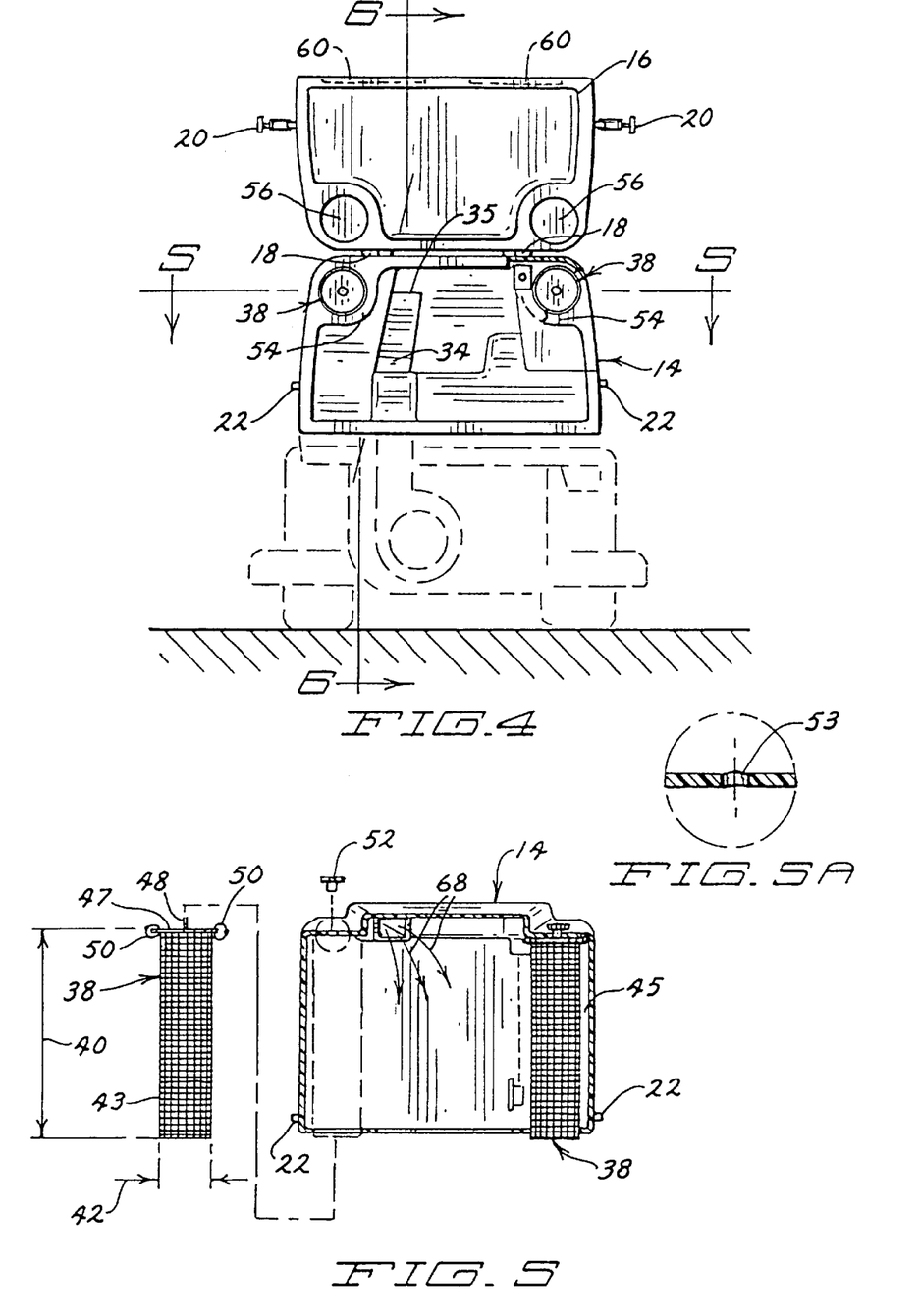
FIG. 4 is a rear elevational view of the preferred grass catcher of FIG. 1 with the rear door of the grass catcher opened to place the inside of the catcher into view.
FIG. 5 is a sectional view taken along line 5—5 of FIG. 4 with one of the air filters removed from the grass catcher.
FIG. 5A is an enlarged sectional view of the portion of FIG. 5 encircled in dashed line.
Figure 9:
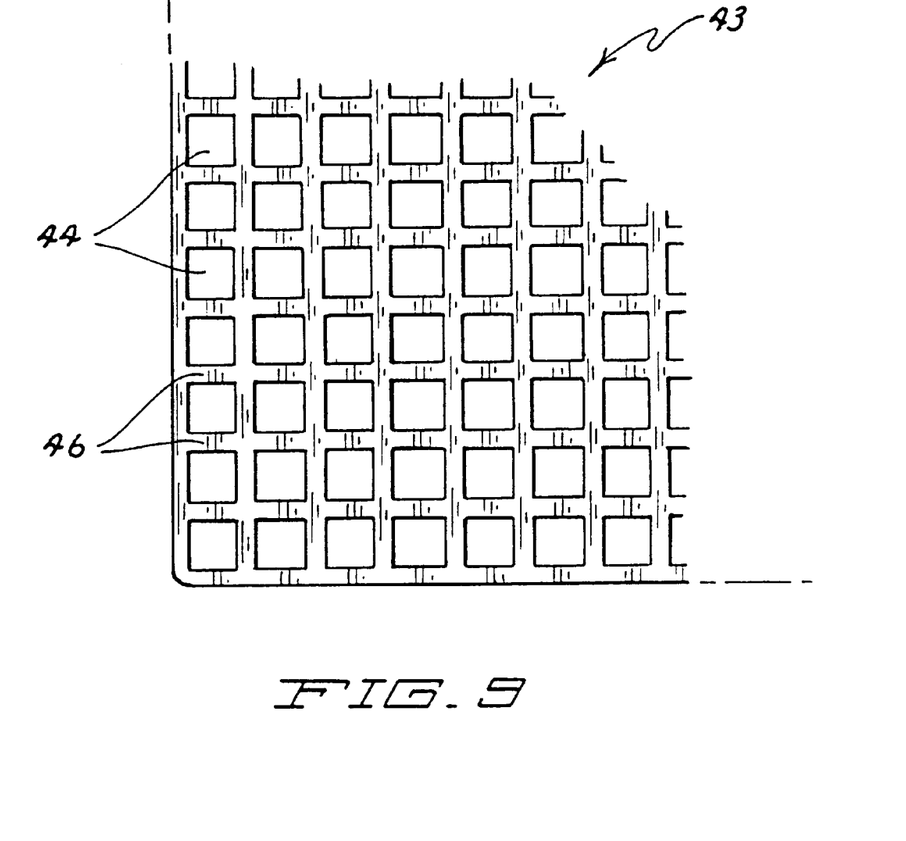
FIG. 9 is an enlarged break-out view of the air filter screen of the preferred catcher of FIG. 1.

The grass catcher 14 of the preferred embodiment includes a pair of cylindrical, perforate air filters 38 which is best shown in FIGS. 5 and 6. Each filter 38 comprises a cylindrical, perforate filter screen 43 and an endcap 47. As shown in FIG. 9, the perforate air filter screen is a mesh having three square openings 44 per lineal inch (nine openings per square inch) separated by a 0.075 inch wide polyethylene band 46. While the screen 43 is originally planar, it is pliable and easily formed into the desired cylindrical shape. A plurality of rivets (not shown) pass through the overlapping perforations 44 to maintain the cylindrical shape of the screen 43. In the preferred embodiment, the filter screens 43 have a length 40 of approximately twenty-three inches and a diameter 42 of approximately six inches. The end caps 47 are approximately six inches in diameter, roughly the same diameter as the cylindrical filter screens 43. The end caps 47 are attached to the filter screens by a plurality of cable ties 50. The cable ties 50 wrap through openings 44 in the filter screens 43 and through holes (not shown) in the end caps 47. Each end cap 47 includes an integral (i.e., welded), threaded stud 48 extending perpendicularly from the center of the end cap 47 opposite the filter screen 43. Thus, the filter screen 43, end cap 47, and stud 48 operatively define the perforate air filter 38, two of which are present in the preferred embodiment.

Still referring to FIG. 5, the stud 48 is threaded to receive a mating threaded knob 52. An aperture 53 extends through the front catcher wall such that when the filter 38 is inserted into the catcher 14, the stud 48 protrudes through the aperture. Accordingly, when the knobs 52 are tightened to their respective studs 48, each filter 38 is positively retained within the catcher 14. A pair of flanges 54, molded integrally with the catcher 14, support the filters 38 at their rearward or distal ends. A clearance 45, which is best viewed in FIGS. 5 and 6, exists between each filter 38 and the interior side and top of the catcher 14. The distal ends of the filters 38 extend past the flanges 54 of the grass catcher 14 as shown in FIG. 5. That is, when the door 16 is open or removed, the filters 38 extend beyond the rear edge of the catcher 14.

The door 16 includes a pair of openings 56 for accepting the extending portion of the filters 38 when the door 16 is in its closed position. The openings 56 are best shown in FIGS. 3 and 4 while FIG. 6 shows the position of the filters 38 when the door 16 is closed. The door 16 also includes an air passageway 58 that fluidly connects the door openings 56 to a pair of outlet ports 60 located on the bottom of the door 16 (shown in FIGS. 4 and 6).

Figure 8:
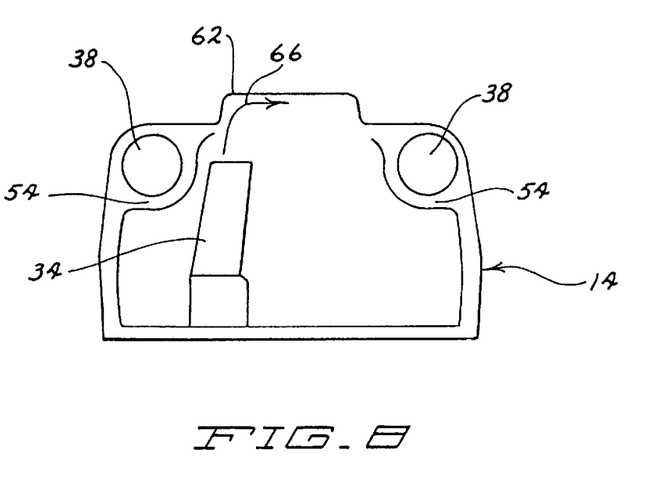
FIG. 8 is a rear diagrammatic view of the preferred grass catcher of FIG. 1 with the rear door of the catcher removed.

Referring to FIG. 6, the air pattern into and through the grass catcher 14 (when the door 16 is closed) will now be described. First, grass that is cut by the cutting deck 4 is propelled through conduits 26 and 28 by the blower 24. Grass clippings and air are discharged through the upper end 30 of the conduit 28 and through the entrance port 32 and into the extension tube 34. Grass and air are expelled from the extension tube 34 at the inlet 35 to the interior of the catcher 14. After the grass and air pass through the inlet 35, an upper surface 62 deflects the flow rearwardly and downwardly as indicated by an arrow 64 in FIG. 6 and also to the right of the catcher as shown by an arrow 66 in FIG. 8. The resultant deflection caused by the surface 62 is shown by arrows 68 as seen in FIG. 5. Thus, clippings that enter the catcher 14 at the inlet 35 (which is preferably located generally front and left of the center of the catcher 14) are deflected by the surface 62 to the right and rear of the center of the catcher 14. This deflection results in more even distribution of clippings within the catcher 14 which, in turn, enhances catcher capacity. This enhanced capacity increases run-time between required emptying of the catcher 14.

The filters 38 of the present invention are advantageous for several reasons. First, by transversely offsetting the filters from the inlet 35, the clippings entering the catcher 14 are not directly impinging upon the filter. As such, localized clogging of the perforations 44 is reduced. Secondly, the cylindrical shape of the filters 38 combined with their vertical placement permits complete filling of the catcher without undue restriction of the air flow through the filters. That is, even when the catcher fills above the bottom of the filters, the upper portion of each filter 38 remains in fluid communication with outlet ports 60. This characteristic is generally attributable to the clearance 45 that exists between the catcher walls and the filters 38. Finally, cylindrical filters 38 are advantageous in that they can be economically produced from flat sheets of polyethylene mesh.

FIG. 6 shows the clippings collecting in the grass catcher 14 while the airflow continues on through the filters 38. The air passes freely through the filters 38 while passage of the clippings is restricted. The air passing through the filters 38 exits the distal end of the filters and enters the passageway 58 of the door 16. The air is then exhausted through the outlet ports 60 located on the bottom of the door 16. Thus, the air is exhausted generally down and away from the operator. The location of outlet ports 60 is advantageous as it reduces operator exposure to dusty exhaust air during operation.

An obstruction detection system within the catcher 14 alerts the operator when the catcher becomes full. In the preferred embodiment as shown in FIG. 6, the obstruction detection system comprises an infrared transmitter 70 and an infrared receiver 72. When activated, the transmitter 70 emits an infrared light beam 74 onto the receiver 72. As long as the beam 74 is not blocked by clippings signal continuity is maintained. When the catcher 14 becomes full, the clippings block the beam 74, thus breaking signal continuity. In the preferred embodiment, this results in an audible alarm that indicates the catcher is full. However, those skilled in the art will realize that other alerts (e.g., visual indicators, interruption to mower operation) could also be used and fall within the scope of the invention. In the preferred embodiment, beam 74 must be substantially interrupted for approximately one second before it will alert the operator to a full catcher. This ensures that the normal flow of clippings through the catcher will not cause a false alarm. The obstruction detection system automatically resets approximately three seconds after de-activation. In the preferred embodiment, the transmitter 70, the receiver 72, and the delay circuit define a single assembly manufactured by KDS Controls, Inc., under its part number CR-2150. While the preferred embodiment utilizes a infrared obstruction detection system, detection systems utilizing other wave form energy sensors (e.g., acoustic, electromagnetic, or optical transmitters/receivers other than infrared) are also contemplated.

The transmitter 70 and the receiver 72 should preferably be located such that the "catcher full" alarm is not tripped until the catcher is completely filled. Ideally, the transmitter 70 and the receiver 72 are positioned such that substantial obstruction of beam 74 is not encountered until the catcher is effectively full. In addition to placing the detection system close to the top of the catcher 14, it is positioned laterally according to the distribution pattern of clippings within the catcher. That is, the area immediately beneath beam 74 is generally the last portion of the catcher 14 to fill during the mowing operation. Thus, catcher capacity is maximized.

Once the catcher 14 becomes full, the operator must empty it before mowing may continue. In the preferred embodiment as shown in FIG. 3, the grass catcher 14 pivots to an upward position where the upper end 30 of the discharge conduit 28 is no longer in an abutting relationship to the entrance port 32 of the grass catcher 14. The grass catcher 14 pivots about a pair of coaxial pivot joints 36 and is assisted to its upward position by a pneumatic cylinder 37. The pneumatic cylinder 37 is pivotally connected to the frame of the traction vehicle 1 at a pivot joint 39 and pivotally connected to the catcher at a pivot joint 41. The door 16 can be opened, as previously described, by unlatching the latches 20 from the latch receivers 22. Once unlatched, the door 16 swings open from the catcher 14 about hinges 18 to permit easy emptying of the accumulated grass clippings.

Figure 2:
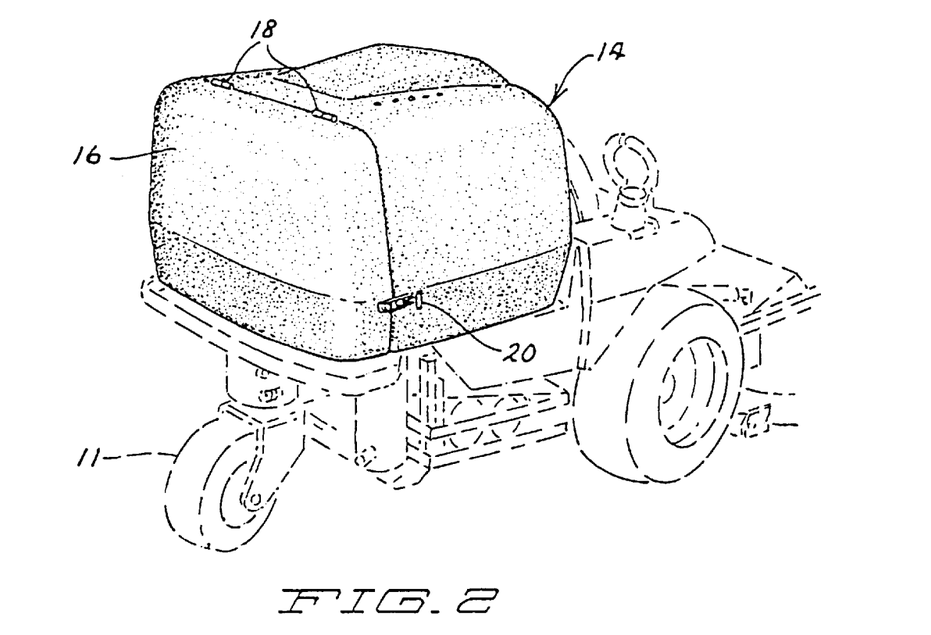
FIG. 2 is a right rear perspective view of the preferred grass catcher of FIG. 1.

After emptying, the catcher may be manually returned to a down or operating position as shown in FIGS. 1, 2 and 6. The grass catcher 14 can be placed in its down position by downwardly urging the catcher 14 with sufficient force to overcome the pneumatic assist cylinder 37. A latch (not shown) positively holds the catcher 14 in its down position.

Normal maintenance may require the periodic removal of the air filters 38. Each air filter 38 can be removed for cleaning or replacing by removing the threaded knob 52 from the stud 48, opening the door 16, and sliding the filter 38 out of catcher 14 from the rear. FIG. 4 shows how the filters 38 may be accessed when the door 16 is in its raised position. Each filter 38 may be reinstalled by inserting the filter (with end cap 47 facing forward) until the stud 48 protrudes through the aperture 53 located at the front of the catcher 14. The knob 52 may then be threaded onto the exposed stud 48, once again securing the filter 38 within the catcher 14.

Figure 7:
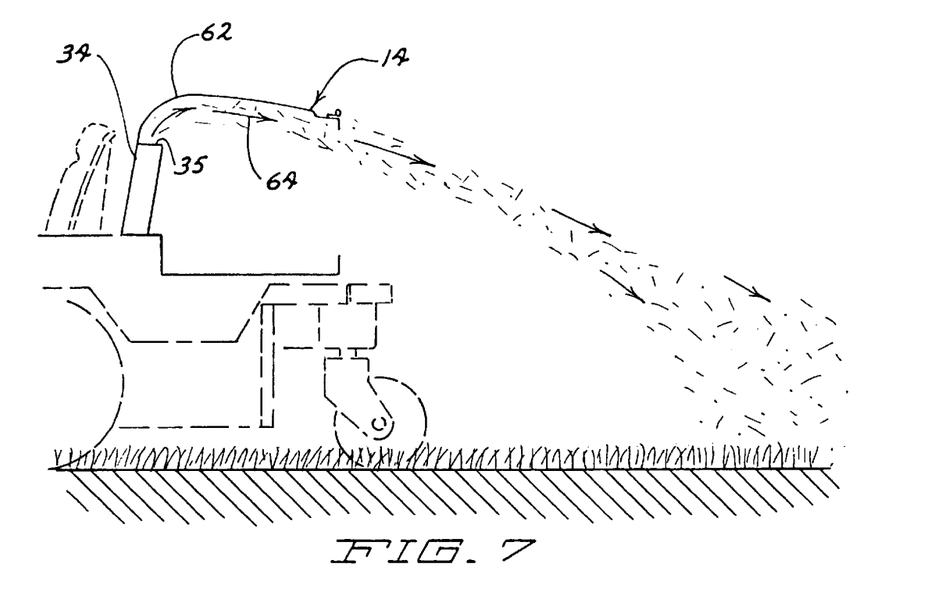
FIG. 7 is a left side elevational view of the preferred grass catcher of FIG. 1 with the rear door of the catcher removed.

The mower 2 and catcher 14 can be operated with the door 16 completely disconnected from the catcher as shown in FIG. 7. The door 16 can be removed by separating the door from catcher 14 at hinges 18 as previously described. When the door 16 is removed, grass clippings discharge freely out of the back of the catcher 14 as shown in FIG. 7. Even without the door attached, the deflector surface 62 directs the clippings to the rear of the catcher 14 where they may exit in a uniform manner. The operator might choose to operate without the door 16 when concern regarding lawn appearance does not warrant catching.

A preferred embodiment of the invention is described above. Those skilled in the art will recognize that many embodiments are possible within the scope of the invention. Variations and modifications of the various parts and assemblies can certainly be made and still fall within the scope of the invention. Thus the invention is limited only to the apparatus recited in the following claims, and equivalents thereof.

We claim:

1. A grass mowing and catching apparatus comprising:
   a) a traction vehicle;
   b) a rotary grass cutting deck operatively connected to the traction vehicle;
   c) a discharge conduit fluidly connected to and extending away from the cutting deck, the discharge conduit having an upper end;
   d) a grass catcher operatively connected to the traction vehicle wherein the upper end of the discharge conduit is operatively connected to the grass catcher; and
   e) an air filter apparatus comprising at least two cylindrical, perforate air filters mounted within the catcher, wherein the air filter apparatus is fluidly connected to an air outlet in the grass catcher for exhausting air from the grass catcher and wherein the air filter apparatus separates grass clippings from air flowing through the catcher by permitting air to pass through the perforate air filters to the catcher outlet while restricting passage of grass clippings, wherein the clippings then accumulate in the grass catcher.

2. The grass mowing and catching apparatus of claim 1, wherein each cylindrical, perforate air filter is constructed of polyethylene.

3. The grass mowing and catching apparatus of claim 2, further comprising a blower for propelling clippings and air from the cutting deck, through the discharge conduit, and into the grass catcher.

4. The grass mowing and catching apparatus of claim 1, wherein the air outlet exhausts air in a downward direction relative to the grass catcher.

5. The grass mowing and catching apparatus of claim 4, wherein the cylindrical, perforate air filters are removably mounted within the grass catcher to facilitate cleaning and replacement of the filters.

6. The grass mowing and catching apparatus of claim 5, further comprising a hinged door movable between a first, closed position and a second, open position; the second, open position facilitating clipping removal from the grass catcher.

7. The grass mowing and catching apparatus of claim 6, wherein the grass catcher is hingedly connected to the traction vehicle and is movable between a first position wherein the catcher is operatively connected to the upper end of the discharge conduit and a second position wherein the catcher is disconnected from the upper end of the discharge conduit; the second position facilitating clipping removal from the grass catcher when the door is in its second, open position.

8. The grass mowing and catching apparatus of claim 7, wherein the cylindrical, perforate air filters are between 22 and 24 inches in length and between 5 and 7 inches in diameter.

9. The grass mowing and catching apparatus of claim 8, wherein the cylindrical, perforate air filters comprise nine square openings per square inch and wherein the openings are separated by 0.075±0.12 inch wide polyethylene bands.

10. The grass mowing and catching apparatus of claim 9, wherein the hinged door further comprises the air outlet for exhausting air in a downward direction relative to the grass catcher.

11. The grass mowing and catching apparatus of claim 10, wherein the hinged door further comprises at least one air passageway for fluidly connecting the cylindrical, perforate air filters with the air outlet when the door is in its first, closed position and wherein the cylindrical, perforate air filters are fluidly disconnected from the air outlet when the door is in its second, open position.

12. A grass catcher for receiving air and grass clippings from a mower cutting deck comprising:
   a) an inlet for admitting air and clippings into the grass catcher;
   b) an outlet port for exhausting air out of the grass catcher; and
   c) a pair of cylindrical, perforate air filters mounted within the grass catcher and interposed between the inlet and the outlet port, wherein the filters separate grass clippings from the air and permit air to pass through the filters and on to the outlet port.

13. The grass catcher of claim 12, wherein the two cylindrical, perforate air filters are substantially identical in shape and size to one another.

14. The grass catcher of claim 13, wherein the cylindrical, perforate air filters are constructed of polyethylene.

15. The grass catcher of claim 12, wherein the cylindrical, perforate air filters are removably mounted within the grass catcher to facilitate cleaning and replacement of the filters.

16. The grass catcher of claim 15, further comprising a hinged door movable between a first, closed position and a second, open position; the second, open position facilitating clipping removal from the grass catcher.

17. The grass catcher of claim 16, wherein the hinged door further comprises the outlet port for exhausting air out of the grass catcher.

18. The grass catcher of claim 17, wherein the outlet port is downwardly facing in relation to the hinged door and the grass catcher wherein the outlet port exhausts air in a downward direction when the door is in the first, closed position.

19. The grass catcher of claim 18, wherein the hinged door is operatively connected to the catcher by at least one hinge and wherein the door can be disconnected from the catcher by manipulation of the hinge(s), wherein the grass clippings and air are permitted to pass through an opening in the catcher created when the door is disconnected from the catcher.

20. A grass catcher for receiving air and grass clippings from a mower cutting deck comprising:
   a) an inlet for admitting air and clippings into the grass catcher from the cutting deck;
   b) an outlet port for exhausting air out of the grass catcher;
   c) a pair of cylindrical, perforate air filters mounted within the grass catcher and interposed between the inlet and the outlet port, wherein the filters separate grass clippings from the air and permit air to pass through the filters and on to the outlet port; and
   d) an upper surface of the grass catcher near the inlet wherein the upper surface deflects grass clippings entering the grass catcher wherein such deflection enhances the even distribution of grass clippings within the grass catcher and enhances the grass clipping capacity of the grass catcher.

21. The grass catcher of claim 20, wherein the upper surface is interposed between the pair of cylindrical, perforate air filters.

22. A grass catcher for a lawn mower for receiving air and grass clippings from a mower cutting deck comprising:
   a) an inlet for admitting air and clippings into the grass catcher;
   b) an outlet port for exhausting air out of the grass catcher;
   c) a pair of cylindrical, perforate filters interposed between the inlet and the outlet port wherein the filters separate grass clippings from the air and permit air to pass through the filters and on to the outlet port; and
   d) a wave form energy transmitter and a wave form energy receiver both positioned in the grass catcher at a location distal from the inlet, wherein the transmission of wave form energy between the transmitter and the receiver is interrupted when the level of accumulated grass clippings within the catcher exceeds a predetermined level and wherein the interruption of the transmission triggers an alarm to alert an operator of the mower of the high clipping level within the catcher.

23. The grass catcher of claim 22, wherein the wave form energy transmitted between the transmitter and the receiver is infrared.

24. The grass catcher of claim 23, further comprising means for delaying the triggering of the alarm until transmission of the wave form energy between the transmitter and the receiver has been interrupted longer than a predetermined time.

25. The grass catcher of claim 24, wherein the predetermined time is approximately one second.

26. A grass mowing and catching apparatus comprising:
   a) a traction vehicle;
   b) a rotary grass cutting deck operatively connected to the traction vehicle;
   c) a discharge conduit extending away from the cutting deck, the discharge conduit having an upper end;
   d) a grass catcher operatively connected to the traction vehicle wherein the upper end of the discharge conduit is operatively connected to the grass catcher and wherein the grass catcher further comprises an inlet for admitting air and clippings into the catcher;
   e) a pair of cylindrical, perforate air filters mounted within the catcher, wherein the air filters are fluidly connected to an air outlet in the grass catcher and wherein the air filters separate grass clippings from air flowing through the catcher by permitting air to pass through the air filters and on to the catcher outlet while restricting passage of grass clippings, wherein the clippings then accumulate in the grass catcher; and
   f) a wave form energy transmitter and a wave form energy receiver both positioned in the grass catcher at a location distal from the inlet, wherein the transmission of wave form energy between the transmitter and the receiver is interrupted when the level of accumulated grass clippings within the catcher exceeds a predetermined level and wherein the interruption of the transmission triggers an alarm to alert an operator of the mower to warn of the high clipping level within the catcher.

27. The grass mowing and catching apparatus of claim 26, wherein the wave form energy transmitted between the transmitter and the receiver is infrared.

28. The grass mowing and catching apparatus of claim 27, further comprising means for delaying the triggering of the signal until transmission of the wave form energy between the transmitter and the receiver has been interrupted longer than a predetermined time.

29. The grass mowing and catching apparatus of claim 28, wherein the predetermined time is approximately one second.

30. A grass mowing and catching apparatus comprising:
   a) a traction vehicle;
   b) a rotary grass cutting deck operatively connected to the traction vehicle, the deck having a discharge chute;
   c) a discharge conduit fluidly connected to and extending away from the cutting deck discharge chute, the discharge conduit having an upper end;
   d) a grass catcher operatively connected to the traction vehicle wherein the upper end of the discharge conduit is operatively connected to the grass catcher; and
   e) an air filter apparatus comprising at least two cylindrical, perforate air filters mounted adjacent to the upper end of the discharge conduit, wherein the air filter apparatus is fluidly connected to an air outlet in the grass catcher for exhausting air from the grass catcher and wherein the air filter apparatus separates grass clippings from air flowing through the catcher by permitting air to pass through the perforate air filters to the catcher outlet while restricting passage of grass clippings, wherein the clippings then accumulate in the grass catcher.

31. A grass catcher for receiving air and grass clippings from a mower cutting deck comprising:
   a) an inlet for admitting air and clippings into the grass catcher;
   b) an outlet port for exhausting air out of the grass catcher; and
   c) a pair of cylindrical, perforate air filters mounted adjacent to the inlet and interposed between the inlet and the outlet port, wherein the filters separate grass clippings from the air and permit air to pass through the filters and on to the outlet port.

32. A grass catcher for receiving air and grass clippings from a mower cutting deck comprising:
   a) an inlet for admitting air and clippings into the grass catcher from the cutting deck;
   b) an outlet port for exhausting air out of the grass catcher;
   c) a pair of cylindrical, perforate air filters mounted adjacent to the inlet and interposed between the inlet and the outlet port, wherein the filters separate grass clippings from the air and permit air to pass through the filters and on to the outlet port; and
   d) an upper surface of the grass catcher near the inlet wherein the upper surface deflects grass clippings entering the grass catcher wherein such deflection enhances the even distribution of grass clippings within the grass catcher and enhances the grass clipping capacity of the grass catcher.

* * * * *